United States Patent
Tawari et al.

(10) Patent No.: US 11,447,127 B2
(45) Date of Patent: Sep. 20, 2022

(54) METHODS AND APPARATUSES FOR OPERATING A SELF-DRIVING VEHICLE

(71) Applicants: HONDA MOTOR CO., LTD., Tokyo (JP); THE REGENTS OF THE UNIVERSITY OF CALIFORNIA, Oakland, CA (US)

(72) Inventors: Ashish Tawari, Santa Clara, CA (US); Yi-Ting Chen, Sunnyvale, CA (US); Teruhisa Misu, Mountain View, CA (US); John F. Canny, Berkeley, CA (US); Jinkyu Kim, Albany, CA (US)

(73) Assignees: HONDA MOTOR CO., LTD., Tokyo (JP); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 453 days.

(21) Appl. No.: 16/436,510

(22) Filed: Jun. 10, 2019

(65) Prior Publication Data
US 2020/0384981 A1 Dec. 10, 2020

(51) Int. Cl.
| | | |
|---|---|---|
| *B60W 30/02* | (2012.01) | |
| *G05D 1/00* | (2006.01) | |
| *G05D 1/02* | (2020.01) | |
| *B60W 10/04* | (2006.01) | |
| *B60W 10/20* | (2006.01) | |

(Continued)

(52) U.S. Cl.
CPC .......... *B60W 30/025* (2013.01); *B60W 10/04* (2013.01); *B60W 10/20* (2013.01); *G05D 1/0088* (2013.01); *G05D 1/0246* (2013.01); *G06K 9/6262* (2013.01); *G06V 20/58* (2022.01); *G10L 15/22* (2013.01); *G10L 15/26* (2013.01); *B60W 2554/00* (2020.02);

(Continued)

(58) Field of Classification Search
CPC .... B60W 30/025; B60W 10/04; B60W 10/20; B60W 2554/00; B60W 2710/20; B60W 2710/106; G05D 1/0088; G05D 1/0246; G05D 2201/0213; G06K 9/00805; G06K 9/6262; G06K 9/00791; G10L 15/22; G10L 15/26; G10L 2015/223
USPC .......................................................... 701/28
See application file for complete search history.

(56) References Cited

U.S. PATENT DOCUMENTS

| | | | |
|---|---|---|---|
| 9,715,233 B1 * | 7/2017 | Mandeville-Clarke | ...................... G01C 21/362 |
| 10,338,594 B2 * | 7/2019 | Long | ...................... B60W 30/00 |

(Continued)

OTHER PUBLICATIONS

Julien Despois, "Latent space visualization—Deep Learning bits #2", Feb. 23, 2017, <https://hackernoon.com/latent-space-visualization-deep-learning-bits-2-bd09a46920df> (Year: 2017).*

(Continued)

*Primary Examiner* — Krishnan Ramesh
(74) *Attorney, Agent, or Firm* — ArentFox Schiff LLP

(57) ABSTRACT

Aspects of the present disclosure may include methods, apparatuses, and computer readable media for receiving one or more images having a plurality of objects, receiving a notification from an occupant of the self-driving vehicle, generating an attention map highlighting the plurality of objects based on at least one of the one or more images and the notification, and providing at least one of a steering control or a velocity control to operate the self-driving vehicle based on the attention map and the notification.

18 Claims, 6 Drawing Sheets

(51) Int. Cl.
    *G06K 9/62*     (2022.01)
    *G10L 15/22*     (2006.01)
    *G10L 15/26*     (2006.01)
    *G06V 20/58*     (2022.01)

(52) U.S. Cl.
CPC ... *B60W 2710/20* (2013.01); *B60W 2720/106* (2013.01); *G05D 2201/0213* (2013.01); *G10L 2015/223* (2013.01)

(56) References Cited

U.S. PATENT DOCUMENTS

| | | | |
|---|---|---|---|
| 11,200,429 | B1* | 12/2021 | Evans .................. G06N 3/08 |
| 2007/0005609 | A1* | 1/2007 | Breed .................. B60W 50/00 |
| 2018/0134285 | A1* | 5/2018 | Cho .................. G08G 1/09626 |
| 2019/0126942 | A1* | 5/2019 | Goto .................. B60W 10/20 |
| 2019/0221121 | A1* | 7/2019 | Guo .................. G06V 10/82 |
| 2019/0244107 | A1* | 8/2019 | Murez .................. G06N 3/084 |
| 2019/0266346 | A1* | 8/2019 | O'Brien .................. G06V 20/176 |
| 2020/0041276 | A1* | 2/2020 | Chakravarty .................. G06N 3/088 |
| 2020/0089251 | A1* | 3/2020 | Golestan Irani .... G06F 16/3347 |
| 2020/0111492 | A1* | 4/2020 | Bilgory .................. G06F 3/167 |
| 2020/0175326 | A1* | 6/2020 | Shen .................. G05D 1/0253 |
| 2020/0189572 | A1* | 6/2020 | Rowell .................. B60W 50/10 |
| 2020/0200556 | A1* | 6/2020 | Boston .................. G01C 21/3644 |
| 2020/0272162 | A1* | 8/2020 | Hasselgren .................. G06N 3/063 |
| 2020/0293041 | A1* | 9/2020 | Palanisamy .................. G06N 3/08 |
| 2020/0310370 | A1* | 10/2020 | Bogo .................. G05B 13/0265 |
| 2021/0049468 | A1* | 2/2021 | Karras .................. H04N 19/85 |
| 2021/0261146 | A1* | 8/2021 | Inoue .................. G10L 15/08 |

OTHER PUBLICATIONS

Abadi, M. et al.. "TensorFlow: Large-Scale Machine Learning on Heterogeneous Distributed Systems", arXiv: 1603.04467v2 [cs.DC], Mar. 16, 2016, (Preliminary White Paper, Nov. 9, 2015), (19 Pages total).
Andrew G. Howard et al., "MobileNets: Efficient Convolutional Neural Networks for Mobile Vision Applications", arXiv:1704.04861v1 [cs.CV] Apr. 17, 2017, (9 Pages Total), 2017.
Bojarski, M. et al., "End to End Learning for Self-Driving Cars", arXiv:1604.07316v1 [cs.CV] ,Apr. 25, 2016, (9 Pages Total).
Bojarski, M. et al., "VisualBackProp: visualizing CNNs for autonomous driving", arXiv preprint, (13 Pages Total), 2016.
Chi. L. et al., "Learning End-to-End Autonomous Steering Model from Spatial and Temporal Visual Cues", VSCC '17, (pp. 9-16), 2017.
Christian Szegedy et al., "Inception-v4, Inception-ResNet and the Impact of Residual Connections on Learning", Proceedings of the Thirty-First AAAI Conference on Artificial Intelligence (AAAI-17), (7 Pages Total), 2017.
Christian Szegedy et al., "Rethinking the Inception Architecture for Computer Vision", In Proceedings of the IEEE Conference on Computer Vision and Pattern Recognition (CVPR), (pp. 2818-2826), 2016.
Diederik P. Kingma et al., "ADAM: A Method for Stochastic Optimization", Proceedings of International Conference for Learning Representations (ICLR) 2015, arXiv:1412.6980v9 [cs.LG] Jan. 30, 2017, (15 Pages Total).
Dipendra K. Misra et al., "Environment-Driven Lexicon Induction for High-Level Instructions", Proceedings of the 53rd Annual Meeting of the Association for Computational Linguistics and the 7th International Joint Conference on Natural Language Processing, (pp. 992-1002), 2015.
Dipendra K. Misra et al., "Tell me Dave: Context-sensitive grounding of natural language to manipulation instructions", The International Journal of Robotics Research, vol. 35(1-3), (pp. 281-300), 2016.
Dong Huk Park et al., "Multimodal Explanations: Justifying Decisions and Pointing to the Evidence", Conference on Computer Vision and Pattern Recognition(CVPR), (10 Pages Total), 2018.
Dr. J. McCarthy, Session 1: Paper 3: Programs with common sense, RLE and MIT computation center, 1960. (17 Pages Total).
Gregory Kuhlmann et al., "Guiding a Reinforcement Learner with Natural Language Advice: Initial Results in RoboCup Soccer", Proceedings of the AAAi-2004 Workshop on Supervisory Control of Learning and Adaptive Systems, (6 Pages Total), Jul. 2004.
Huan Ling et al., "Teaching Machines to Describe Images via Natural Language Feedback", arXiv:1706.00130v2 [cs.CL] Jun. 5, 2017, 2017. (13 Pages Total).
Huazhe Xu et al., "End-to-end Learning of Driving Models from Large-scale Video Datasets", In Proceedings of the IEEE Conference on Computer Vision and Pattern Recognition, (pp. 2174-2182), 2017.
Jason Weston., "Dialog-based Language Learning", 30th Conference on Neural Information Processing Systems (NIPS 2016), (9 Pages Total), 2016.
Jinkyu Kim et al., "Interpretable Learning for Self-Driving Cars by Visualizing Causal Attention", Proceedings of the IEEE International Conference on Computer Vision (ICCV), (pp. 2942-2950), 2017.
Jinkyu Kim et al., "Textual Explanations for Self-Driving Vehicles", In European Conference on Computer Vision (ECCV), (16 Pages Total), 2018.
Jiwei Li et al., "Dialogue Learning With Human-In-The-Loop", ICLR 2017, arXiv:1611.09823v3 [cs.AI] Jan. 13, 2017,(23 Pages Total), 2017.
Nitish Srivastava et al., "Dropout: A Simple Way to Prevent Neural Networks from Overfitting", Journal of Machine Learning Research, 15, (pp. 1929-1958), 2014.
Rajesh Rajamani., Mechanical Engineering Series, Vehicle Dynamics and Control, Springer, 2006. (497 Pages Total).
Stefanie Tellex et al., "Understanding Natural Language Commands for Robotic Navigation and Mobile Manipulation", Proceedings of the Twenty-Fifth AAAI Conference on Artificial Intelligence, (pp. 1507-1514), 2011.
Tharindu Fernando et al., "Going Deeper: Autonomous steering with neural memory networks", (ICCV), (pp. 214-221), 2017.
Tung, H.-Y, et al., "Reward Learning from Narrated Demonstrations", Proceedings of the IEEE Conference on Computer Vision and Pattern Recognition (CVPR), (10 Pages Total), 2018.
Vasili Ramanishka et al., "Toward Driving Scene Understanding: A Dataset for Learning Driver Behavior and Causal Reasoning", In Proceedings of the IEEE Conference on Computer Vision and Pattern Recognition (CVPR), (pp. 7699-7707), 2018.
Wei Liu et al., "SSD: Single Shot MultiBox Detector", in Proceedings of European Conference on Computer Vision (ECCV), (17 Pages Total), 2016.
Xavier Glorot et al., "Understanding the difficulty of training deep feedforward neural networks", In Proceedings of the 13th International Conference on Artificial Intelligence and Statistics (AISTATS), vol. 9 , (pp. 249-256), 2010.
Yoav Artzi et al., "Weakly Supervised Learning of Semantic Parsers for Mapping Instructions to Actions", Transactions of the Association of Computational Linguistics, I, (pp. 49-62), 2013.

\* cited by examiner

METHODS AND APPARATUSES FOR OPERATING A SELF-DRIVING VEHICLE

TECHNICAL FIELD

The present disclosure generally relates to controlling self-driving vehicles.

BACKGROUND

Self-driving vehicles may provide more comfort to occupants because the vehicles may require minimum human input in when navigating on the roads. The occupants may read, converse with each other, use phones, or even sleep as the vehicles autonomously drive from the origin to the destination. Further, self-driving vehicles may be safer than human driven vehicles by eliminating distractions, fatigue, and emotions that may cause drivers to incorrectly or dangerously operate the vehicles.

Algorithms for implementing autonomous driving may be important to the development of self-driving vehicles. These algorithms may include training a deep neural network to map a dashcam image to steering controls, implementing a statement model using a dilated deep neural network and recurrent neural network to predict a vehicle's motion, and other computer visions/machine learning techniques. When implementing autonomous driving, the algorithms may be unable to address the different needs of the occupants, such as comfort (e.g., operating the vehicles with minimum "jerking" motions to prevent motion sickness) speed (e.g., arriving at the destination at early as possible without violating traffic laws), and/or fuel conservation (e.g., reducing rapid acceleration or deceleration). Therefore, improvements in algorithms for operating self-driving vehicles may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure may include receiving one or more images having a plurality of objects, receiving a notification from an occupant of the self-driving vehicle, generating an attention map highlighting the plurality of objects based on at least one of the one or more images and the notification, and providing at least one of a steering control or a velocity control to operate the self-driving vehicle based on the attention map and the notification.

Other aspects of the present disclosure may include a self-driving vehicle having a memory and one or more processors configured to perform the steps of receiving one or more images having a plurality of objects, receiving a notification from an occupant of the self-driving vehicle, generating an attention map highlighting the plurality of objects based on at least one of the one or more images and the notification, and providing at least one of a steering control or a velocity control to operate the self-driving vehicle based on the attention map and the notification.

Some aspects of the present disclosure may include computer readable media having instructions stored therein, the instructions, when executed by one or more processors of a self-driving vehicle, cause the one or more processors to receive one or more images having a plurality of objects, receive a notification from an occupant of the self-driving vehicle, generate an attention map highlighting the plurality of objects based on at least one of the one or more images and the notification, and provide at least one of a steering control or a velocity control to operate the self-driving vehicle based on the attention map and the notification.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, a passenger bus, motorcycles, scooters, ATVs, generators, lawnmowers boats, personal watercraft, and aircraft. In some cases, a motor vehicle includes one or more engines.

Figure 1:
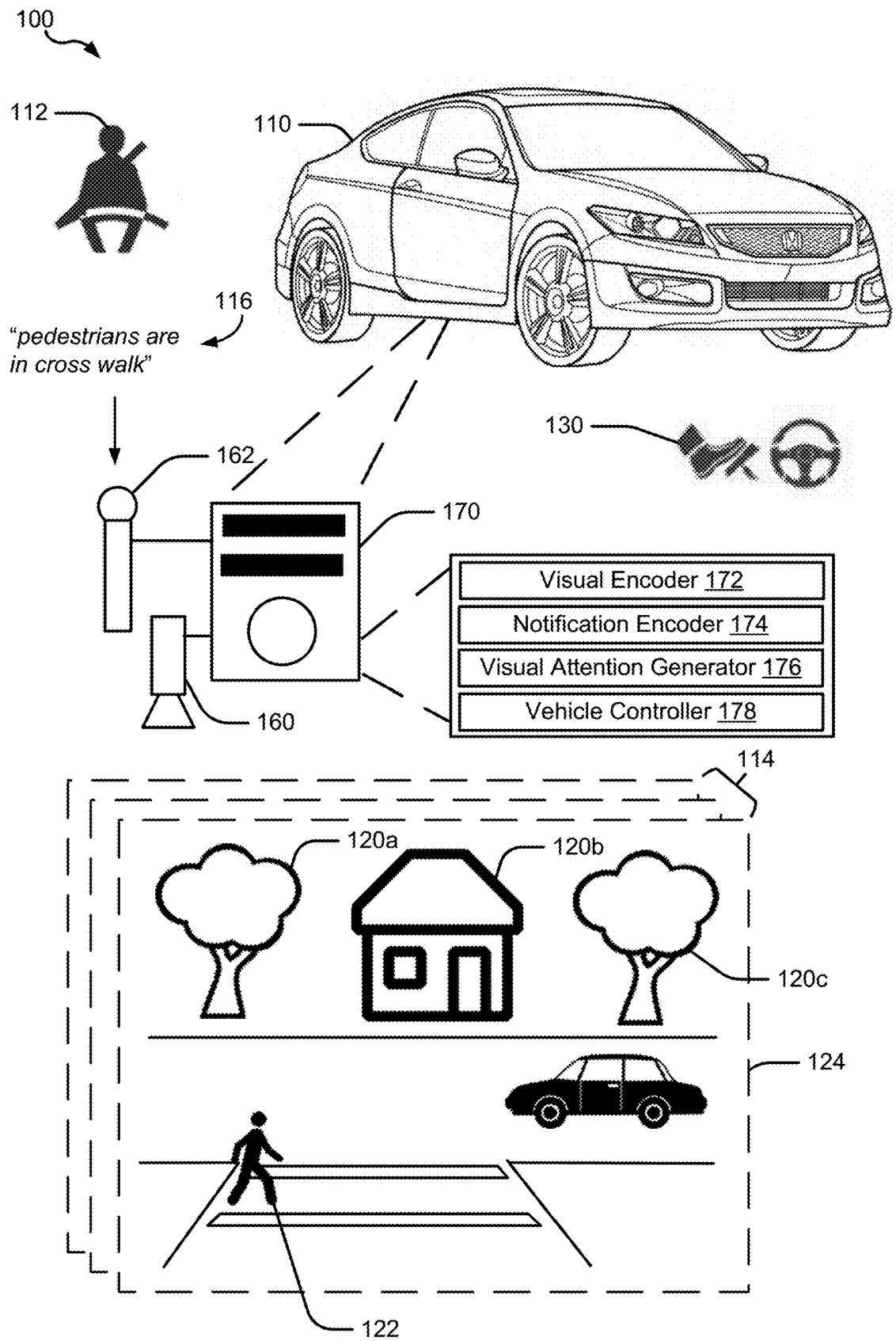
FIG. 1 illustrates a schematic view of an example of an environment for operating a self-driving vehicle in accordance with aspects of the present disclosure.

Turning to FIG. 1, an example of an environment 100 for providing control commands to a self-driving vehicle 110 may include an occupant 112. The self-driving vehicle 110 may further include one or more cameras 160 and/or input device 162 communicatively coupled to a prediction system 170 having a visual encoder 172, an notification encoder 174, a visual attention generator 176, and a vehicle controller 178. The one or more cameras 160 may be capable of capturing still or moving images in a vicinity of the self-driving vehicle 110, such as in front of, next to, or behind the vehicle 110. The input device 162 may include a microphone, a physical keyboard, a key pad, a virtual keyboard or other devices capable of receiving notification from the occupant 112. The visual encoder 172 may be configured to process images and extract one or more visual feature vectors from the processed images. The visual encoder 172 may provide descriptions associated with the one or more visual feature vectors. The notification encoder 174 may accept input notification (e.g., "pedestrians are in crosswalk" or "drive slow in a school zone"), such as voice input notification and/or textual input notification. The visual attention generator 176 may rely on the visual features vectors to generate one or more attention heatmaps including attention weight "particles" (spatial points on the processed image indicating the salient portions). The vehicle controller 178 may utilize the attention heatmaps and/or the input notification to provide controlling commands (e.g., stop, decelerate, or turn) to the self-driving vehicle 110.

In some implementations, the example of the environment 100 may include one or more images 114 captured by the one or more cameras 160 and/or one or more notification 116 received by the input device 162. The one or more images 114 may illustrate the surroundings near the self-driving vehicle 110, such as the front of, next to, or behind the self-driving vehicle 110. The one or more images 114 may include images captured at different times, different angles with respect to the self-driving vehicles 110, different camera resolutions, different color schemes (i.e., full color, black/white), etc. In a non-limiting example, the one or more images 114 may include a first object 120a, a second object 120b, a third object 120c, a pedestrian 122, and a moving car 124. The objects 120 may be approximately stationary, and the pedestrian 122 and the moving car 124 may be moving or approximately stationary. The one or more notification 116 may be provided by the occupant 112 relating to driving practices, safety, comfort, or other scenarios.

In some implementations, during normal operations, the prediction system 170 may analyze the one or more images 114 captured by the one or more cameras 160. After capturing the one or more images 114, the prediction system 170 may utilize the visual encoder 172 to preprocess the one or more images 114 and extract a set of visually descriptive latent vectors. The notification encoder 174 may process and/or analyze the one or more notification 116, such as performing a speech-to-text conversion of the one or more notification 116 and extracting the content of the one or more notification 116. The visual attention generator 176 may utilize the descriptive latent vectors relating to the one or more images 114 and/or the content of the one or more notification 116 to generate at least one attention heatmap highlighting at least some portions of the one or more images 114. The vehicle controller 178 may rely on the at least one attention heatmap to output control signals to control the acceleration and/or the steering of the self-driving vehicle 110.

While FIG. 1 shows an example of providing commands to the self-driving vehicle 110 by a person, the algorithms, methods, apparatuses, and/or computer media described in the present disclosure are not so limited. For example, the algorithms, methods, apparatuses, and/or computer media described in the present disclosure may be implemented in a self-driving vehicle, including levels 1-5 autonomous vehicles. Further, in other examples, the algorithms, methods, apparatuses, and/or computer media described in the present disclosure may be implemented in robotic appliances, pattern prediction applications, modeling and/or simulations applications, video games, computer games, and/or other applications.

Figure 2:
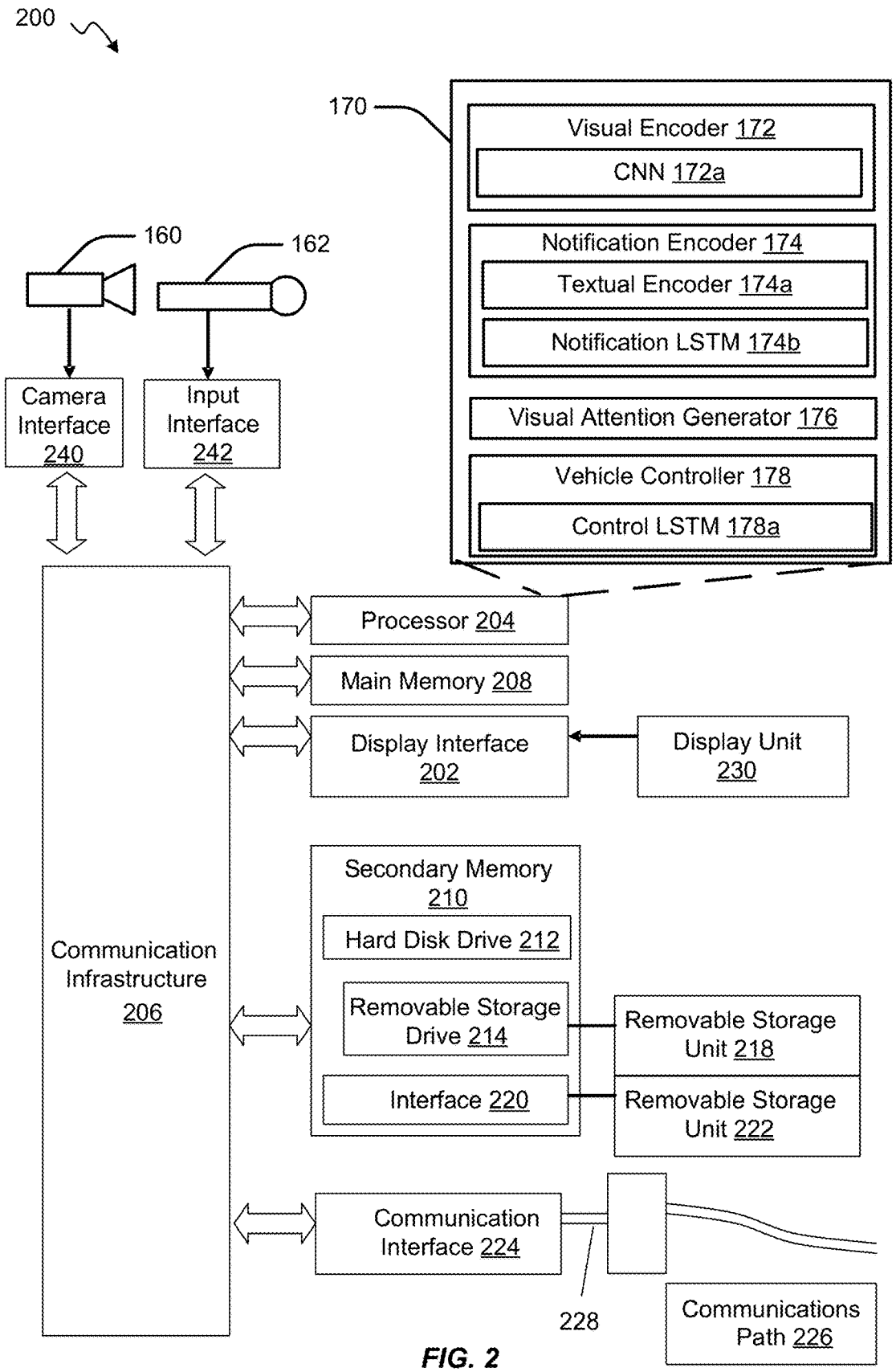
FIG. 2 illustrates an example of a computer system for implementing a method of operating a self-driving vehicle in accordance with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. For example, features of the prediction system 170 may be implemented as one or more computer systems described in FIG. 2. An example of such the computer system 200 is shown in FIG. 2.

The computer system 200 includes one or more processors, such as the processor 204. The processor 204 is connected to a communication infrastructure 206 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

The processor 204 may include the visual encoder 172 having a convolutional neural network (CNN) 172a for obtaining a set of visually-descriptive latent vectors. The processor 204 may include the notification encoder 174 having a textual encoder 174a and a notification long short-term memory (LSTM) 174b. The textual encoder 174a may convert the one or more notification 116 spoken by the occupant 112 into texts. The notification LSTM 174b may encode the one or more notification 116 into a fixed size latent vector representing the content of the one or more notification 116. The processor 204 may include the vehicle controller 178 having a control LSTM 178a that tracks the current state of the self-driving vehicle 110 and outputs control signals to control the steering and the acceleration of the self-driving vehicle 110.

The computer system 200 may include a display interface 202 that forwards graphics, text, and other data from the communication infrastructure 206 (or from a frame buffer not shown) for display on a display unit 230. Computer system 200 also includes a main memory 208, preferably random access memory (RAM), and may also include a secondary memory 210. The secondary memory 210 may include, for example, a hard disk drive 212, and/or a removable storage drive 214, representing a floppy disk drive, a magnetic tape drive, an optical disk drive, a universal serial bus (USB) flash drive, etc. The removable storage drive 214 reads from and/or writes to a removable storage unit 218 in a well-known manner. Removable storage unit 218 represents a floppy disk, magnetic tape, optical disk, USB flash drive etc., which is read by and written to removable storage drive 214. As will be appreciated, the removable storage unit 218 includes a computer usable storage medium having stored therein computer software and/or data.

Alternative aspects of the present disclosure may include secondary memory 210 and may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, an RF link and/or other communications channels. In this document, the terms "computer program medium" and "computer usable medium" are used to refer generally to media such as a removable storage drive 218, a hard disk installed in hard disk drive 212, and signals 228. These computer program products provide software to the computer system 200. Aspects of the present disclosure are directed to such computer program products.

Computer system 200 may include a camera interface 240 for receiving image data from the one or more cameras 160. The camera interface 240 may communicate with the one or more cameras 160 via wired or wireless communications media. The image data may be transmitted in Joint Photographic Experts Group (JPEG) format, Tagged Image File Format (TIFF), Graphics Interchange Format (GIF), Windows Bitmap (BMP) format, Portable Network Graphics (PNG) format, or other suitable formats.

The computer system 200 may include an input interface 242 for receiving input notification, such as voice input, gesture input, and/or text input, from the input device 162. The input device 162 may include a microphone, a physical keyboard, a key pad, a virtual keyboard or other devices capable of receiving notification from the occupant 112.

Computer programs (also referred to as computer control logic) are stored in main memory 208 and/or secondary memory 210. Computer programs may also be received via communications interface 224. Such computer programs, when executed, enable the computer system 200 to perform the features in accordance with aspects of the present disclosure, as discussed herein. In particular, the computer programs, when executed, enable the processor 204 to perform the features in accordance with aspects of the present disclosure. Accordingly, such computer programs represent controllers of the computer system 200.

In an aspect of the present disclosure where the method is implemented using software, the software may be stored in a computer program product and loaded into computer system 200 using removable storage drive 214, hard drive 212, or communications interface 220. The control logic (software), when executed by the processor 204, causes the processor 204 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 3:
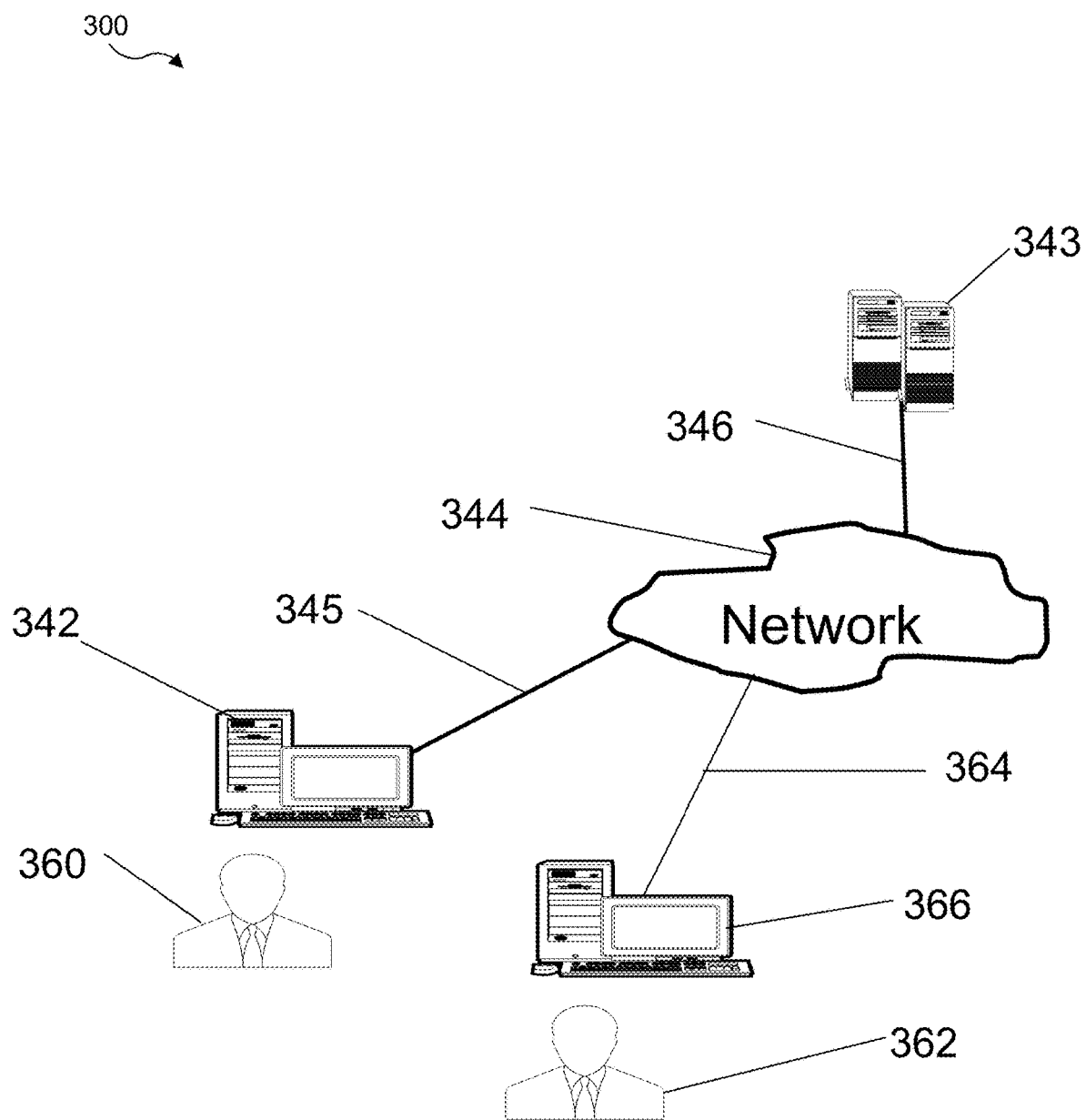
FIG. 3 illustrates a block diagram of various example system components, in accordance with aspects of the present disclosure.

FIG. 3 illustrates a block diagram of various example system components, in accordance with an aspect of the present disclosure. FIG. 3 shows a communication system 300 usable in accordance with aspects of the present disclosure. The communication system 300 includes one or more accessors 360, 362 (also referred to interchangeably herein as one or more "users") and one or more terminals 342, 366. In one aspect, data for use in accordance with aspects of the present disclosure is, for example, input and/or accessed by accessors 360, 362 via terminals 342, 366, such as personal computers (PCs), minicomputers, mainframe computers, microcomputers, telephonic devices, or wireless devices, such as personal digital assistants ("PDAs") or a hand-held wireless devices coupled to a server 343, such as a PC, minicomputer, mainframe computer, microcomputer, or other device having a processor and a repository for data and/or connection to a repository for data, via, for example, a network 344, such as the Internet or an intranet, and couplings 345, 346, 364. The couplings 345, 346, 364 include, for example, wired, wireless, or fiberoptic links. In another example variation, the method and system in accordance with aspects of the present disclosure operate in a stand-alone environment, such as on a single terminal.

Figure 4:
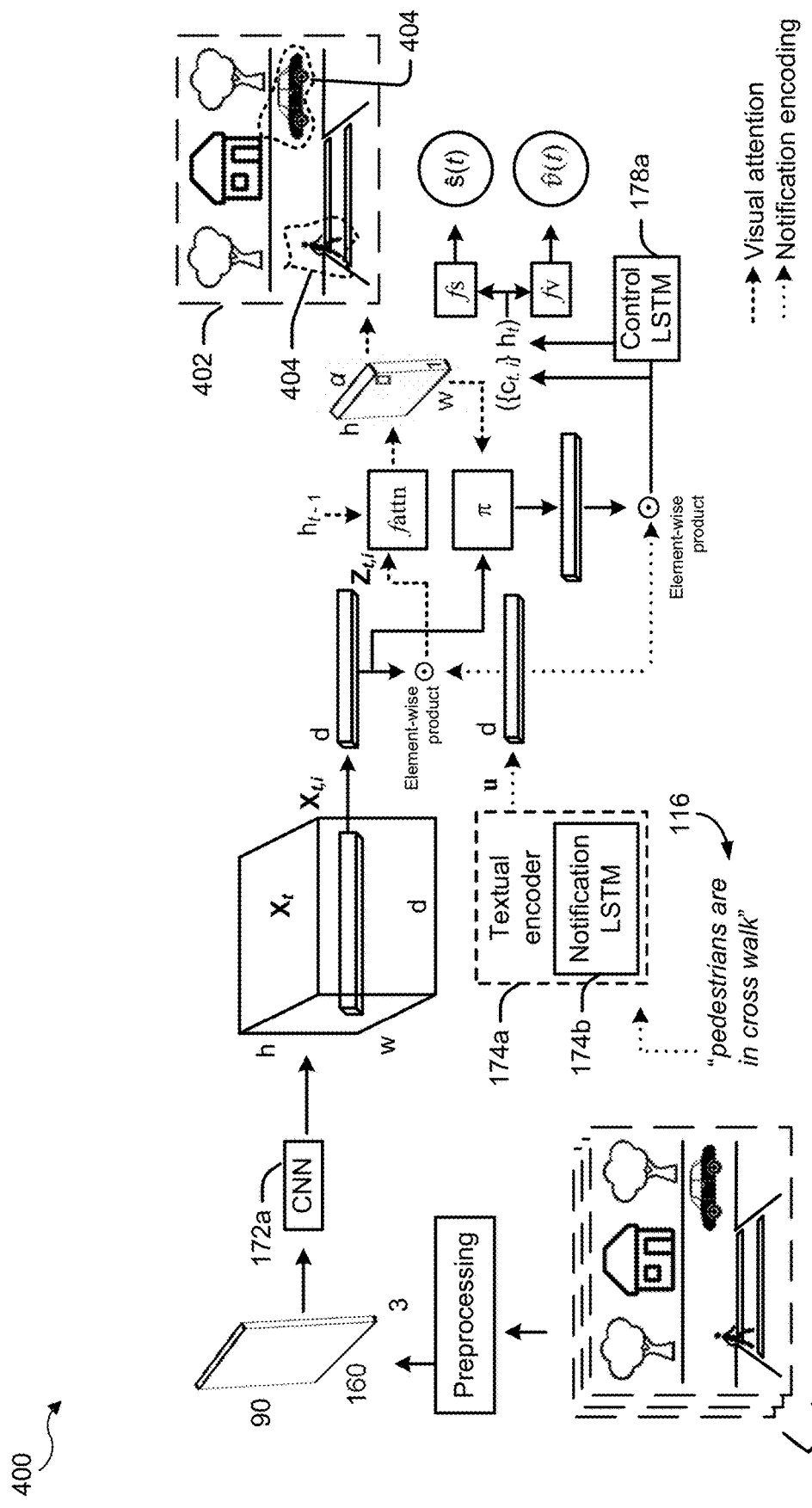
FIG. 4 illustrates an example of an algorithm for operating a self-driving vehicle in accordance with aspects of the present disclosure.

Referring to FIG. 4, and referencing FIG. 2, in some implementations, an example of an algorithm 400 for operating the self-driving vehicle 110 may utilize a visual (spatial) attention mechanism that highlights image regions to generate an output, such as a steering and/or an acceleration command. The visual encoder 172 of the prediction system 170 may optionally preprocess the one or more images 114. For example, the visual encoder 172 may down-sample the one or more images 114 at, for example, 10 kilohertz (kHz). The visual encoder 172 of the prediction system 170 may resize the one or more images 114 to a dimensionality, such as 90×160×3. Each image of the one or more images 114 may then be normalized by subtracting the mean from the raw pixels and dividing by the standard deviation. The visual encoder 172 may change the saturation, hue, and brightness of the one or more images 114 for achieving robustness during a training phase. Other preprocessing mechanisms may also be used to prepare the one or more images 114.

In some examples, the CNN 172a of the visual encoder 172 may obtain a set of visually-descriptive latent vectors ($x_{t,i}$) at time t, where each vector may contain a high-level visual description in certain input region of the one or more images 114. The set of visually-descriptive latent vectors $x_{t,i}$ may collectively form a convolutional feature cube $X_t$. By feeding an image of the one or more images 114 through the algorithm at each time t, the CNN $172_a$ may construct the cube $X_t$ of size w×h×d. The cube $X_t$ may have l (=w×h) (spatially) different visually-descriptive latent vectors $x_{t,i}$ each of which may be a d-dimensional feature slice corresponding to a certain input region of the one or more images 114. Mathematically, the cube $X_t$ may be defined as follows: $X_t = \{x_{t,1}, x_{t,2}, \ldots, x_{t,l}\}$, where $x_{t,i} \in \mathcal{R}^d$ for $i \in \{1, 2, \ldots, l\}$. Choosing a subset of these vectors may allow the prediction system 170 to focus selectively on different parts of the one or more images 114 (i.e., attention).

In some implementations, the notification encoder 174 may accept two types of notification, i.e., the goal-oriented and the stimulus-driven notification, without any input-level separation (i.e., the occupant 112 may input both types of notification similarly). The notification LSTM 174b may encode the one or more notification 116 and to generate the fixed-size latent vector. The notification encoder 174 may receive a variable-length notification (e.g., verbal or textual), such as the one or more notification 116, and output a latent vector u representing the one or more notification 116. For verbal notification, the textual encoder 174a of the notification encoder 174 may perform a speech-to-text conversion and generate textual representations of the one or more notification 116. The notification LSTM 174b may receive the textual representations of the one or more notification 116 (directly input by the occupant 112 or converted by the textual encoder 174a) and produce a latent vector u. The latent vector u may have the same dimension as the visually descriptive latent vectors $x_{t,i}$. The notification encoder 174, the textual encoder 174a, and/or the notification LSTM 174b may understand the one or more notification 116 and ground it into the vehicle controller. The one or more notification 116 may be given offline, or at the beginning of a trip, e.g., "look out for pedestrians" or "drive gently (occupant gets carsick)." Thus, notification encoding may be prepared ahead of the vehicle controller 178 generating control commands. Formally, the notification LSTM 174b may generate a d-dimensional latent vector $u \in \mathcal{R}^d$.

In certain examples, the notification encoder 174 may rely on a synthetic token <none> to indicate a lack of input from the occupant 112.

Still referring to FIG. 4 and referencing FIG. 2, in some implementations, the visual attention generator 176 may first use an element-wise multiplication to combine the latent vector u from the notification encoder 174 and each of the descriptive-visual latent vectors $x_{t,i}$ from the visual encoder 172 to obtain feature vectors $z_{t,i} = x_{t,i} \odot u$. While the vehicle controller 178 may accept a new image at every time t (thus, updating $x_{t,i}$), the latent vector u may remain the same or change, depending on the presence of additional inputs from the occupant 112.

In some implementations, the visual attention generator 176 may generate one or more attention heatmaps 402. Visual attention provides introspective explanations by filtering out non-salient image regions, while image areas inside the attended region have potential causal effect on the output. Next, the visual attention generator 176 may attempt to find a context $Y_t = \{y_{t,1}, y_{t,2}, \ldots, y_{t,l}\}$ by minimizing a loss function, where $y_{t,i} = \pi(\alpha_{t,i}, x_{t,i}) = \alpha_{t,i} x_{t,i}$ for $i = \{1, 2, \ldots, l\}$. The scalar attention weight value $a_{t,i}$ in [0, 1] may be associated with a certain location of the one or more images 114 is such that $\Sigma_i \alpha_{t,i} = 1$. The visual attention generator 176 may use a multi-layer perceptron $f_{attn}$ to generate $\alpha_{t,i}$, i.e., $\alpha_{t,i} = f_{attn}(x_{t,i}, h_{t-1})$ conditioned on the previous hidden state $h_{t-1}$, and the current feature vector $x_{t,i}$. Softmax regression function may be used to obtain the final attention weight. Based on the values of $\alpha_{t,i}$ and the previous hidden state $h_{t-1}$, the visual attention generator 176 may generate one or more attention heatmaps 402 having highlights 404 that bring visual focus to portions of the one or more attention heatmaps 402.

In certain examples, to internalize stimulus-driven notification to certain images of the one or more images 114, the example algorithm 400 includes a loss term, i.e., the Kullback-Leibler divergence ($D_{KL}$), between two attention heatmaps (i.e., generated with and without notification) to make the driving model refer to the same salient objects:

$$\mathcal{L}_a = \lambda_a \sum_t D_{KL}(\alpha_t^w \| \alpha_t^{wo}) = \lambda_a \sum_t \sum_{i=1}^{I} \alpha_{t,i}^w \left( \log \frac{\alpha_{t,i}^w}{\alpha_{t,i}^{wo}} \right)$$

where $\alpha^w$ and $\alpha^{wo}$ are the attention maps generated by the vehicle controller with and without notification given, respectively. The term hyperparameter $\lambda_a$ may control the strength of the regularization term.

In some implementations, the vehicle controller 178 and/or the control LSTM 178a may utilize a loss function, which includes three terms: (1) $\mathcal{L}_p$, which may be proportional to the error (i.e., $|e_v(t)| + |e_s(t)|$, where $e_v(t) = v(t) - \hat{v}(t)$ and $e_s(t) = s(t) - \hat{s}(t)$, (2) $\mathcal{L}_d$, which may be proportional to the derivative of the error $$\left(\text{i.e., } \frac{d}{dt}e_s(t) \text{ and } \frac{d}{dt}e_s(t)\right),$$

and (3) $\mathcal{L}_i$, which may be proportional to the integral of the error. The vehicle controller 178 and/or the control LSTM 178a may use the difference in the future course $\theta(t)$–a cardinal direction in which the self-driving vehicle 110 is to be steered. The vehicle controller 178 and/or the control LSTM 178a may approximate a steering wheel angle $s_t \approx L/r$, where L is the length of wheelbase and r is the radius of the vehicle's path. Then, the vehicle controller 178 and/or the control LSTM 178a may approximate the vehicle's course $$\theta(t) \approx \frac{v(t)\tau}{r} \approx s(t)v(t)$$

after the unit time $\tau = 1$, using the following loss function $\mathcal{L}$:

$$\mathcal{L} = \mathcal{L}_a + \frac{1}{T}\sum_{t=0}^{T-1} [\overbrace{|e_v(t)| + |e_s(t)|}^{\mathcal{L}_p} + \lambda_i \overbrace{|\theta(t) - \hat{\theta}(t)|}^{\mathcal{L}_i} + \lambda_d \underbrace{\left(\left|\frac{d}{dt}e_v(t)\right|^2 + \left|\frac{d}{dt}e_s(t)\right|^2\right)}_{\mathcal{L}_d}]$$

where T is the number of timesteps. The vehicle controller 178 and/or the control LSTM 178a may use hyperparameters $\lambda_d$ and $\lambda_i$ to control the strength of the terms.

Still referring to FIG. 4, in some aspects, the vehicle controller 178 and/or the control LSTM 178a may utilize the latent vector u based on the one or more notification 116 and/or the one or more attention heatmaps 402 based on the one or more images 114 to generate a steering angle control ŝ(t) and a velocity control v̂(t) for the self-driving vehicle 110. In one non-limiting example, the vehicle controller 178 may transmit the steering angle control ŝ(t) signal to a mechanical, electrical, pneumatic, or hydraulic steering system known to one skilled in the art to control the steering wheel of the self-driving vehicle 110, and the velocity control v̂(t) signal to a mechanical, electrical, pneumatic, or hydraulic acceleration system known to one skilled in the art to control the velocity and/or acceleration of the self-driving vehicle 110.

Figure 5:
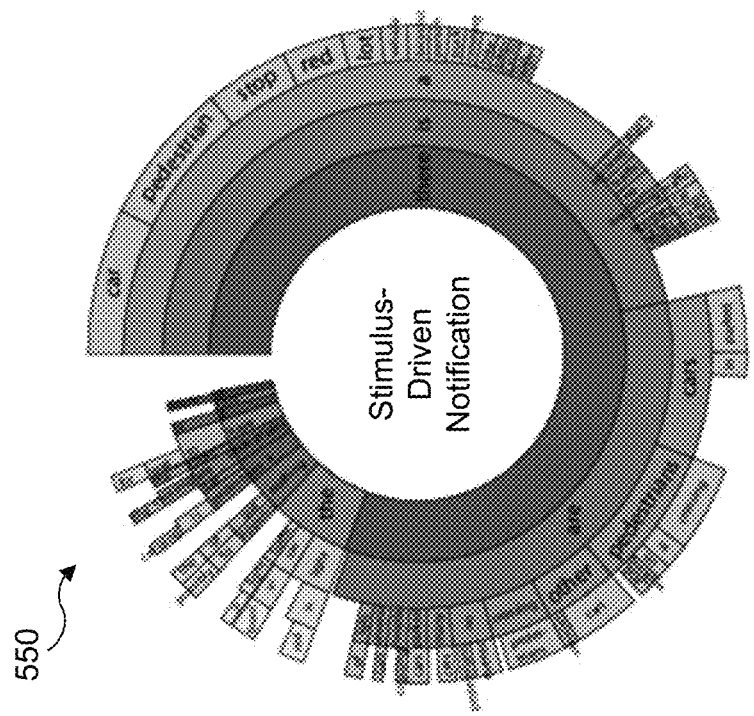
FIG. 5 illustrates an example of distributions of notification in accordance with aspects of the present disclosure.
Figure 5:
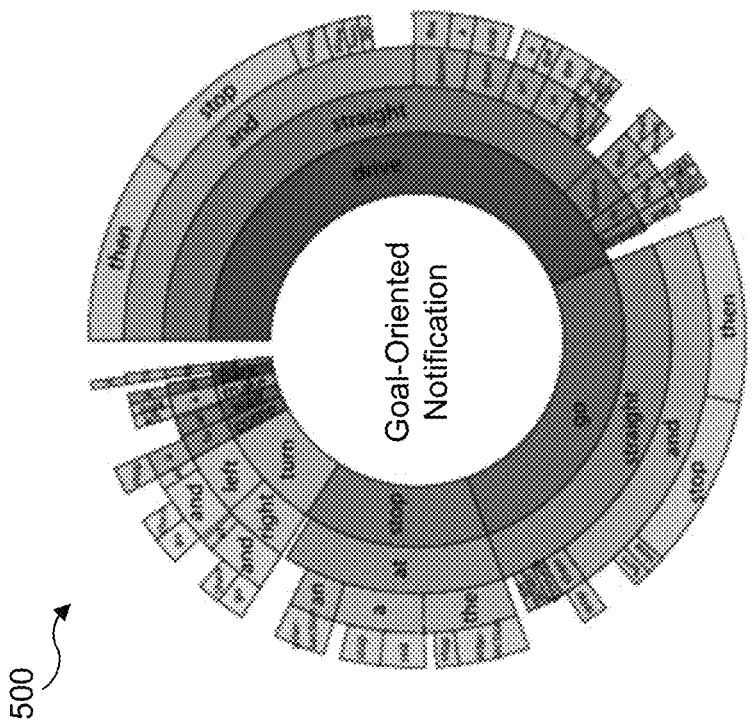

Turning to FIG. 5, a diagram 500 indicates a distribution of goal-oriented notification and a diagram 550 indicates a distribution of stimulus-driven notification. There exists a variety of notification for both types of notification. The diagram 500 with goal-oriented notification includes notification that mainly start with "drive/go straight," "stop at," and "turn right/left," while the stimulus-driven notification start with "there is/are" and "the car/light/traffic." The distributions of the goal-oriented notification and the stimulus-driven notification may be stored in the main memory 208, the secondary memory 210, the removable storage units 218, 222, or other suitable storage medium of the prediction system 170.

In one non-limiting example, the goal-oriented notification and the stimulus-driven notification of the diagrams 500, 550 may be derived from annotations of one or more human annotators. The one or more human annotators may be shown a quantity of video clips, for example 5,675 video clips (over 32 hours), each of which may be on average 20 seconds in length. Each video may contain around 1-2 driving activities, e.g., passing through an intersection, lane change, stopping, etc. The videos may be randomly collected from a large-scale driving video dataset. The dataset may contain camera videos—which are captured by a single front-view camera mounted in a fixed position on the roof top of the vehicle. The videos may contain the typical driver's activities (i.e., turning, merging, lane following, etc.) on various road types (i.e., highway, residential roads with and without lane markings, etc.). Alongside the video data, the dataset may provide a set of time-stamped controller area network (CAN) bus records, which contain human driver control inputs (i.e., steering wheel angle, accelerator/brake pedal). The annotators may enter the action description and attention description separately, for example, "The driver crossed lanes from right to left lane" and "There was construction happening on the road", respectively. Each video clip may include 4-5 action descriptions (25,549 in total) and 3-4 attention descriptions (20,080 in total).

Figure 6:
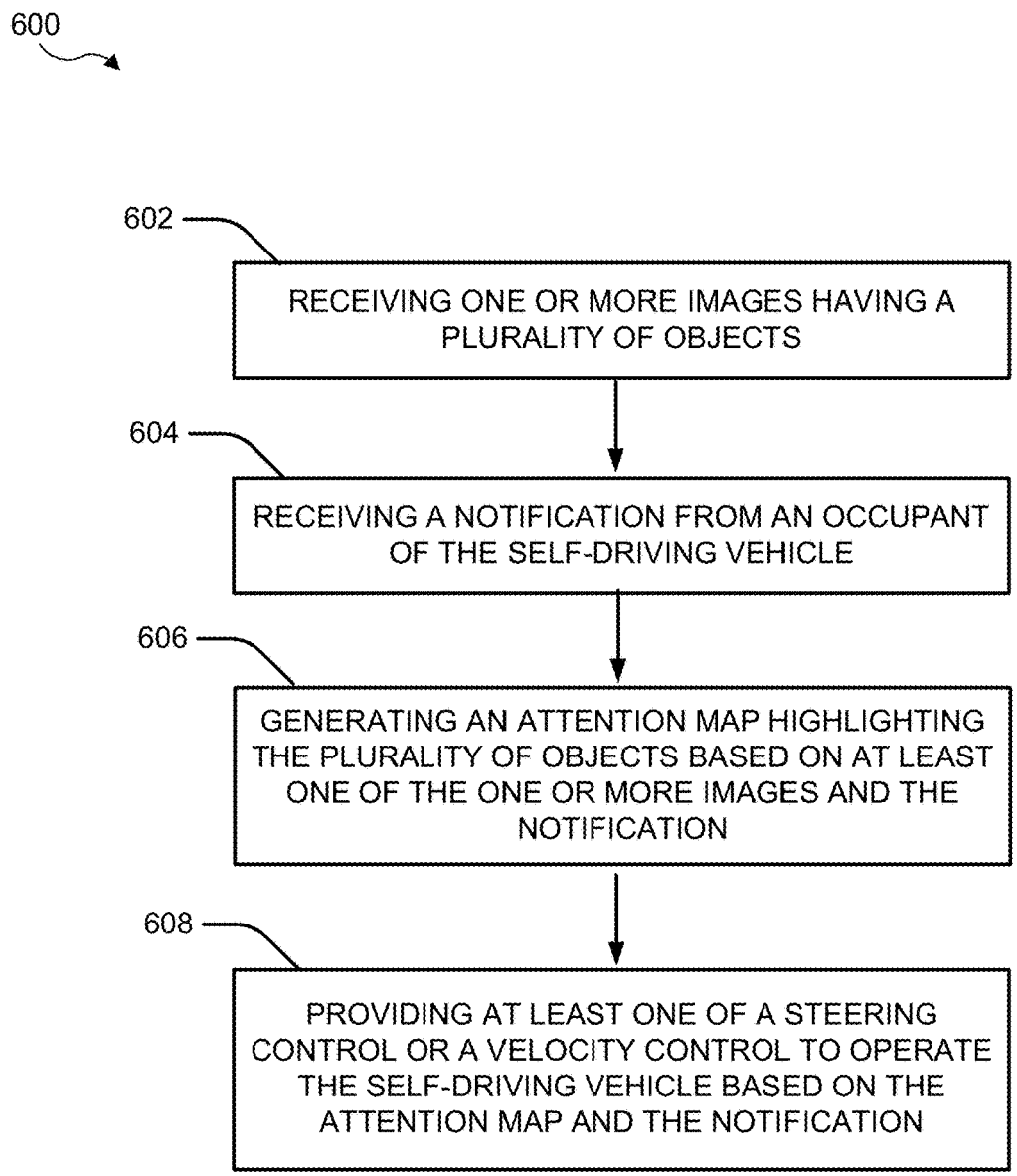
FIG. 6 illustrates a method of operating a self-driving vehicle in accordance with aspects of the present disclosure.

Referring to FIG. 6, in some implementations, an example of method 600 for operating a self-driving vehicle based on an attention map and a notification from an occupant.

At block 602, the method 600 may receive one or more images having a plurality of objects. For example, the visual encoder 172 may receive the one or more images 114 having the pedestrian 122 and the moving car 124.

At block 604, the method 600 may receive a notification from an occupant of the vehicle. For example, the notification encoder 174, the textual encoder 174a, and/or the notification LSTM 174b may receive the one or more notification 116 from the occupant 112 of the self-driving vehicle 110.

At block 606, the method 600 may generate an attention map highlighting the plurality of objects based on at least one of the one or more images or the notification. For example, the visual attention generator 176 may generate one or more attention maps 402 highlighting the pedestrian 122 and the moving car 124 based on the one or more images 114 and the one or more notification 116.

At block 608, the method 600 may provide at least one of a steering control or a velocity control to control an operation of the vehicle based on the attention map and the notification. For example, the vehicle controller 178 may provide at least the steering angle control ŝ(t) and the velocity control v̂(t) to operate the self-driving vehicle 110 based on the one or more attention maps 402 and the one or more notification 116.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for operating a self-driving vehicle, comprising:
   receiving one or more images having a plurality of objects;
   generating a plurality of visually-descriptive latent vectors based on the one or more images;
   receiving a notification from an occupant of the self-driving vehicle;
   generating a latent vector based on the notification;
   generating a feature vector based on the latent vector and at least one of the plurality of visually-descriptive latent vectors;
   generating an attention map highlighting at least some portions of the plurality of objects based on the feature vector; and
   providing at least one of a steering control or a velocity control to operate the self-driving vehicle based on the attention map and the notification.

2. The method of claim 1, further comprises preprocessing the one or more images by performing at least one of a down-sampling, resizing, or normalization.

3. The method of claim 1, wherein the steering control includes controlling a steering angle of a steering wheel of the self-driving vehicle and the velocity control includes a controlling a force applied to an accelerator of the self-driving vehicle.

4. The method of claim 1, further comprises applying the one or more images to a cellular neural network to identify the plurality of objects.

5. The method of claim 1, wherein the notification is a goal-oriented verbal notification or a stimulus-driven verbal notification.

6. The method of claim 5, further comprises, prior to generating the attention map, performing a speech-to-text conversion to generate a textual representation of the notification.

7. A self-driving vehicle, comprising:
   a memory;
   one or more processors communicatively coupled to the memory, the one or more processors perform the steps of:
      receiving one or more images having a plurality of objects;
      generating a plurality of visually-descriptive latent vectors based on the one or more images;
      receiving a notification from an occupant of the self-driving vehicle;

generating a latent vector based on the notification;

generating a feature vector based on the latent vector and at least one of the plurality of visually-descriptive latent vectors;

generating an attention map highlighting at least some portions of the plurality of objects based on the feature vector; and providing at least one of a steering control or a velocity control to control an operation of the vehicle based on the attention map and the notification.

8. The vehicle of claim 7, wherein the one or more processors further perform the steps of preprocessing the one or more images by performing at least one of a down-sampling, resizing, or normalization.

9. The vehicle of claim 7, wherein the steering control includes controlling a steering angle of a steering wheel of the self-driving vehicle and the velocity control includes a controlling a force applied to an accelerator of the self-driving vehicle.

10. The vehicle of claim 7, wherein the one or more processors further perform the steps of applying the one or more images to a cellular neural network to identify the plurality of objects.

11. The vehicle of claim 7, wherein the notification is a goal-oriented verbal notification or a stimulus-driven verbal notification.

12. The vehicle of claim 11, wherein the one or more processors further perform the steps of, prior to generating the attention map, performing a speech-to-text conversion to generate a textual representation of the notification.

13. A non-transitory computer readable medium having instructions stored therein, the instructions, when executed by one or more processors of the self-driving vehicle, cause the one or more processors to:

receive one or more images having a plurality of objects;

generate a plurality of visually-descriptive latent vectors based on the one or more images;

receive a notification from an occupant of the self-driving vehicle;

generate a latent vector based on the notification;

generate a feature vector based on the latent vector and at least one of the plurality of visually-descriptive latent vectors;

generate an attention map highlighting at least some portions of the plurality of objects based on the feature vector; and provide at least one of a steering control or a velocity control to control an operation of the self-driving vehicle based on the attention map and the notification.

14. The non-transitory computer readable medium of claim 13, further comprises instructions, when executed by the one or more processors of the self-driving vehicle, cause the one or more processors to perform at least one of a down-sampling, resizing, or normalization.

15. The non-transitory computer readable medium of claim 13, wherein the steering control includes controlling a steering angle of a steering wheel of the self-driving vehicle and the velocity control includes a controlling a force applied to an accelerator of the self-driving vehicle.

16. The non-transitory computer readable medium of claim 13, further comprises instructions, when executed by the one or more processors of the self-driving vehicle, cause the one or more processors to apply the one or more images to a cellular neural network to identify the plurality of objects.

17. The non-transitory computer readable medium of claim 13, wherein the notification is a goal-oriented verbal notification or a stimulus-driven verbal notification.

18. The computer readable medium of claim 17, further comprises instructions, when executed by the one or more processors of the self-driving vehicle, cause the one or more processors to, prior to generating the attention heatmap, perform a speech-to-text conversion to generate a textual representation of the notification.

* * * * *